United States Patent
Kong et al.

(10) Patent No.: US 10,395,065 B2
(45) Date of Patent: Aug. 27, 2019

(54) PASSWORD PROTECTION UNDER CLOSE INPUT OBSERVATION BASED ON DYNAMIC MULTI-VALUE KEYBOARD MAPPING

(71) Applicant: International Business Machines Corporation, Armonk, NY (US)

(72) Inventors: Li Kong, Beijing (CN); Christopher R. Dotson, Lexington, KY (US); Yi N. Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 14/980,530

(22) Filed: Dec. 28, 2015

(65) Prior Publication Data

US 2017/0185806 A1    Jun. 29, 2017

(51) Int. Cl.
*G06F 21/83* (2013.01)
*G06F 21/45* (2013.01)

(52) U.S. Cl.
CPC .............. *G06F 21/83* (2013.01); *G06F 21/45* (2013.01)

(58) Field of Classification Search
CPC ....... G06F 21/83; G06F 3/04886; G06F 21/45
USPC .......................................................... 726/16
See application file for complete search history.

(56) References Cited

U.S. PATENT DOCUMENTS

| | | | | |
|---|---|---|---|---|
| 5,267,149 A | * | 11/1993 | Anada | G06F 21/34 235/379 |
| 5,565,316 A | * | 10/1996 | Kershaw | G09B 7/02 434/118 |
| 5,719,941 A | * | 2/1998 | Swift | G06F 21/31 340/5.54 |
| 8,321,773 B1 | * | 11/2012 | Pedersen | G06F 7/588 714/749 |
| 9,286,451 B2 | * | 3/2016 | Bao | G06F 21/36 |
| 9,667,623 B2 | * | 5/2017 | Takai | G06F 21/31 |
| 9,679,123 B2 | * | 6/2017 | Yang | G06F 21/31 |

(Continued)

FOREIGN PATENT DOCUMENTS

EP    3193273    * 9/2014  ............. G06F 21/45

OTHER PUBLICATIONS

NPL Search (Google Scholar) (Year: 2019).*

(Continued)

*Primary Examiner* — Samson B Lemma
*Assistant Examiner* — Richard W Cruz-Franqui
(74) *Attorney, Agent, or Firm* — Cahn & Samuels, LLP

(57) ABSTRACT

An embodiment of the invention includes an interface that receives a user identifier, and a processor that identifies the number of characters in the password for the user identifier. The interface receives input such that the number of characters in the input is greater than the number of characters in the password. The interface can receive additional input such that the number of characters in the additional input is greater than the number of characters in the password. The processor can compare the password to the first X characters of the input, where X equals the number of characters in the password. The processor can compare the password to the last X characters of the additional input. The processor can determine whether to authenticate the user based on the comparison of the password to the first X characters of the input and the last X characters of the additional input.

17 Claims, 5 Drawing Sheets

(56) References Cited

U.S. PATENT DOCUMENTS

| | | | | |
|---|---|---|---|---|
| 2004/0177280 | A1* | 9/2004 | Maruyama | G06F 21/31 726/6 |
| 2006/0041758 | A1* | 2/2006 | Dunn | H04M 3/382 713/183 |
| 2006/0294392 | A1* | 12/2006 | Veprek | G06F 21/31 713/183 |
| 2011/0044449 | A1* | 2/2011 | Kim | G06F 21/31 380/1 |
| 2013/0036462 | A1* | 2/2013 | Krishnamurthi | G06F 21/32 726/19 |
| 2013/0047237 | A1* | 2/2013 | Ahn | H04L 9/3226 726/7 |
| 2013/0333007 | A1* | 12/2013 | Chougle | G06F 21/46 726/7 |
| 2014/0245433 | A1* | 8/2014 | Bao | G06F 21/31 726/19 |
| 2015/0172275 | A1* | 6/2015 | Milya | H04L 63/0846 726/6 |
| 2015/0229632 | A1* | 8/2015 | Lee | G06F 21/46 726/4 |
| 2015/0261949 | A1* | 9/2015 | Mori | G06F 21/31 726/19 |
| 2015/0339470 | A1* | 11/2015 | Bates | G06F 21/32 726/18 |
| 2016/0012823 | A1* | 1/2016 | Roos | G10L 17/24 704/239 |
| 2016/0119312 | A1* | 4/2016 | Armstrong | G06F 21/45 713/171 |
| 2017/0279790 | A1* | 9/2017 | Ogawa | G06F 21/34 |

OTHER PUBLICATIONS

Anonymously; "A More Secure and Effective Password Policy"; An IP.com Prior Art Database Technical Disclosure; http://ip.com/IPCOM/000215213; Feb. 22, 2012.

IBM; "System and Method to Prevent Password Observation"; An IP.com Prior Art Database Technical Disclosure; http://ip.com/IPCOM/000174454; Sep. 9, 2008.

\* cited by examiner

| number of keys | Password safety when being observed | Ability to avoid "false" pass |
|---|---|---|
| number of keys = 1 | 100% | 0% |
| less keys | more secure to avoid password leak | less secure to avoid "false" pass |
| more keys | less secure to avoid password leak | more secure to avoid "false" pass |
| number of keys = 26 | 0% | 100% |

FIG. 1

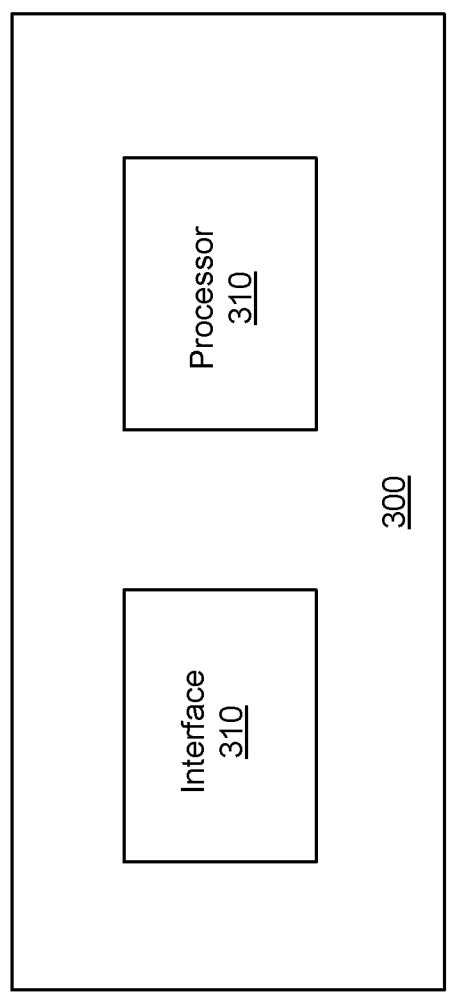

PASSWORD PROTECTION UNDER CLOSE INPUT OBSERVATION BASED ON DYNAMIC MULTI-VALUE KEYBOARD MAPPING

BACKGROUND

The present invention relates to systems, methods, and computer program products for password protection under close input observation based on dynamic multi-value keyboard mapping. A password is a secret word or string of characters that is used for authentication, to prove identity or gain access to a resource. For example, an access code is a type of password. The use of passwords is known to be ancient. Sentries would challenge those wishing to enter an area or approaching it to supply a password or watchword. Sentries would only allow a person or group to pass if they knew the password. In modern times, user names and passwords are commonly used by people during a log in process that controls access to protected computer operating systems, mobile phones, cable TV decoders, automated teller machines (ATMs), etc. A typical computer user may require passwords for many purposes: logging in to computer accounts, retrieving e-mail from servers, accessing programs, databases, networks, web sites, and even reading the morning newspaper online.

SUMMARY OF THE INVENTION

An embodiment of the invention provides a method for determining whether to authenticate a user based on user input, where an interface receives a user identifier. A processor connected to the interface can identify the number of characters in a password for the user identifier. The interface can receive an input from the user such that the number of characters in the input is greater than the number of characters in the password. The interface can also receive an additional input from the user such that the number of characters in the additional input is greater than the number of characters in the password. The processor can compare the password to the first X characters of the input, where X equals the number of characters in the password. The processor can also compare the password to the last X characters of the additional input. The processor can determine whether to authenticate the user based on the comparison of the password to the first X characters of the input and the last X characters of the additional input.

Another embodiment of the invention provides a system for determining whether to authenticate a user based on user input. The system can include a receiving means for receiving a user identifier, an input from the user, and an additional input from the user. The number of characters in the input can be greater than the number of characters in the password corresponding to the user identifier; and, the number of characters in the additional input can be greater than the number of characters in the password. Identification means can identify the number of characters in the password; and, input means can compare the password to the first X characters of the input and/or the last X characters of the input, where X equals the number of characters in the password. An additional input means can compare the password to the first X characters of the additional input and/or the last X characters of the additional input. A determination means can determine whether to authenticate the user based on the results outputted from the input means for comparing and the additional input means for comparing.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 1 is a table illustrating degrees of password safety and false positive reduction according to an embodiment of the invention.

FIG. 3 is a diagram illustrating a system for determining whether to authenticate a user according to an embodiment of the invention.

DETAILED DESCRIPTION

Figure 2A:
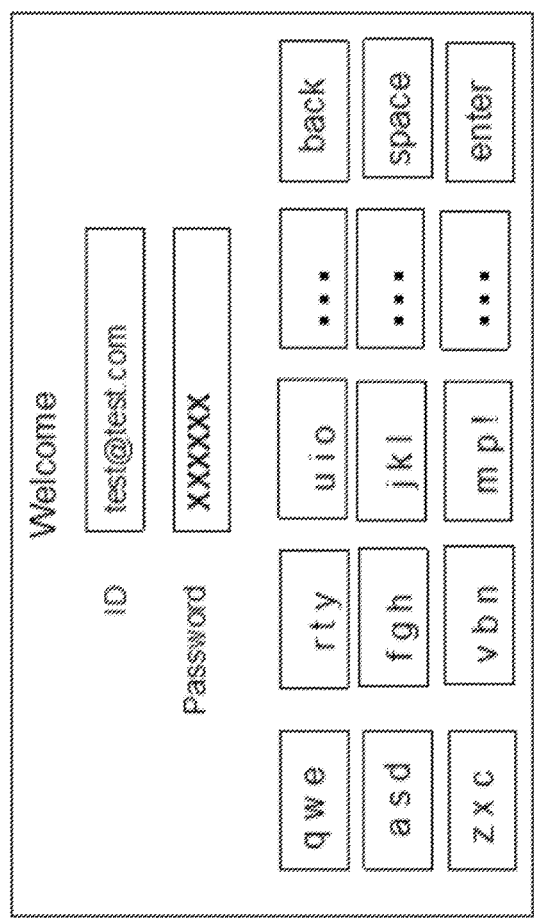
FIG. 2A is a screenshot illustrating a first keyboard layout for password authentication according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

In at least one embodiment of the invention, each key on the keyboard has multiple characters on it, so that a given sequence of key presses yields multiple different password candidates. An authorized user can enter his or her password, followed by some random "filler" characters, then the ENTER key (which changes the keyboard layout), and then more filler characters followed by the password again.

This can prevent an attacker, even one with a video recording, from retrieving the password. The attacker can be left with multiple possibilities for a password, depending upon what filler characters are entered. However, in at least one embodiment, instead of storing a cleartext or reversibly encrypted password, the system stores a one-way hash of the password and the length of the password, which is safer. In addition, due to the addition of filler characters, an attacker may not know the correct length of the password. In at least one embodiment, these characters, being random selections, are easy for the user to enter, so a large number can be entered, which makes things more difficult for the attacker.

The system can adjust the keyboard mapping generation and put 2-n characters on each key. The mapping of a multi-character keyboard can be designed to balance password safety and the ability to avoid false positives (also referred to herein as a false pass). The trade-off between security level and convenience may be considered. For example, given the fixed alphabet for one password (i.e., 26 lower case letters 'a' to 'z'), the degree of password safety and false positive reduction is shown in the table illustrated in FIG. 1, where 100% is a perfect score and 0% is the worst possible score).

Formula 1, below, can be used to identify password exposure probability after the first keyboard layout. The number of the characters on one key can be n (i.e., there are n values on each key); and, the authorized user's password length can be p. With an attacker's observation of the authorized user's password input, the exposure probability of the password can be identified using Formula 1:

$$f(n, p) = \frac{1}{n^p}$$

The exposure probability in Formula 1 depends on the values of n and p, where a greater value for n or p brings a lower exposure probability. For a definite keyboard generation strategy, p can be unknown and uncontrollable, while n can be adjustable based on the authorized user's acceptability for exposure. Whenever set to a chosen value, n can become invariant for every single keyboard generated. For usability reasons, n may not be greater than 5.

For example, the value of n is inferred to be 4 where the password length is 6 and the authorized user's acceptability of exposure probability is 0.1%

$$\frac{1}{n^6} \leq \frac{1}{1000}$$
$$n^6 > 1000$$
$$n \geq 3.16$$

p is the length of the password, which may be stored by the system or may be determined after the password is input into the first keyboard by the user. A new concept C can be brought into the system, so that the total exposure probability of the password can be controlled via the adjustment of the correlation between two keyboard layouts. C is a parameter in the generation of the second keyboard. C is used to ensure that the second keyboard layout is generated so that the total exposure probability is less than or equal to the acceptable exposure probability. $t_m$ can represent the number of characters in the second input sequence on which there can be m (1<=m<=n) values that are the same with the first keyboard layout, which can mean:

$$\sum_{m=1}^{n} t_m = p$$

The total exposure probability of the password can be shown in Formula 2:

$$g(n, p, f, c) = 1 \times \frac{1}{2^{t_2}} \times \frac{1}{2^{t_3}} \times \ldots \times \frac{1}{2^{t_n}}$$

In at least one embodiment, t2=t3 . . . tm−1=0. In other words, the corresponding value mapping on the key with the same position in two successive input sequences can be either equal or orthogonal. The total exposure probability after simplification can be shown in Formula 3:

$$g'(n, p, f, c) = \frac{1}{n^{p-t_1}}$$

According to the above analysis, the mapping-keyboard generation would be as following (pseudocode of generating the second key mapping):

```
Global variables:
    keyNumber -- The number of keys in the keyboard
    alphabet -- The set of all characters shown on the keyboard
    function generateSecondKeyMap(firstKeyMap, clickedKeys,
    orthogonalRatio):
        clickedKeySet = the empty set
        for clickedKey in clickedKeys:
            add clickedKey to clickedKeySet
        orthogonalSize = clickedKeySet.size * orthogonalRatio
        orthogonalKeySet = the empty set
        nonOrthogonalKeySet = clickedKeySet
        for i from 1 to orthogonalSize:
            key = randomChooseOne(nonOrthogonalKeySet)
            add key to orthogonalKeySet
            remove key from nonOrthogonalKeySet
        secondKeyMap = the empty map
        for i from 1 to keyNumber:
            secondKeyMap[i] = the empty set
        remainingCharacters = alphabet
        while nonOrthogonalKeySet is not empty:
            key = randomChooseOne(nonOrthogonalKeySet)
            remove key from nonOrthogonalKeySet
            keyIndex = randomChooseOneAvailableKeyIndex
            (secondKeyMap, the
    empty set)
            secondKeyMap[keyIndex] = firstKeyMap[key]
            for character in firstKeyMap[key]:
                remove character from remainingCharacters
        while orthogonalKeySet is not empty:
            key = randomChooseOne(orthogonalKeySet)
            remove key from orthogonalKey Set
            alreadyChosenKeyIndexSet = the empty set
            for character in firstKeyMap[key]:
                keyIndex = randomChooseOneAvailableKeyIndex
                (secondKeyMap,
    alreadyChosenKeyIndexSet)
                add character to secondKeyMap[keyIndex]
        return secondKeyMap
    function randomChooseOne(set):
        ChosenElement = choose an element in set randomly
        return ChosenElement
    function randomChooseOneAvailableKeyIndex
    (keyMap, excludedKeyIndexSet):
        availableKeyIndexSet = the empty set
        for keyIndex in keyMap.keys:
            if keyMap[keyIndex].size < keyNumber:
                add keyIndex to availableKeyIndexSet
        for keyIndex in excludedKeyIndexSet:
            remove keyIndex from availableKeyIndexSet
        return randomChooseOne(availableKeyIndexSet)
```

Figure 2B:
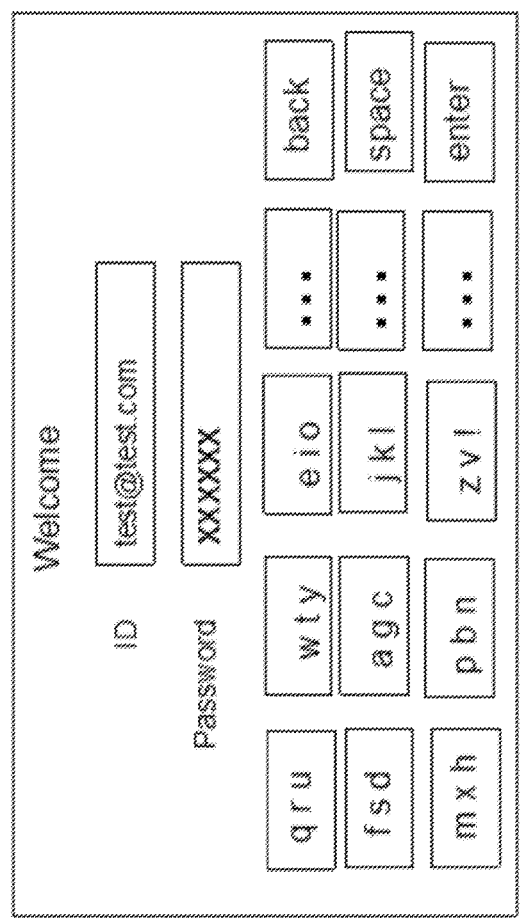
FIG. 2B is a screenshot illustrating a second keyboard layout for password authentication according to an embodiment of the invention.

FIG. 2A is a screenshot illustrating a first keyboard layout for password authentication according to an embodiment of the invention. FIG. 2B is a screenshot illustrating a second keyboard layout for password authentication according to an embodiment of the invention. First, the system can generate the multi-character mapping. The user can enter the password, then an arbitrary number of filler characters. Both the number of filler characters and the filler characters input can be different each time. The user can then presses the ENTER key and the system can generate the second keyboard mapping, which depends on C. C can control the second keyboard mapping and the exposure probability after the second input. The user can then enter as many additional filler characters as desired, and then enter the password a second time.

The system can store a one-way hash of the password and the length of the password L. For the first password entry (before the ENTER key is pressed), the system can discard all but the first L characters. For the second password entry (after the ENTER key is pressed), the system can discard all but the last L characters. The system can then compare the first password entry with the second password entry. Because the keyboard layouts can be orthogonal, there can only be one password that matches both entries. This password can then be fed into the one-way hash function with a salt and compared against the stored hash value.

Figure 4:
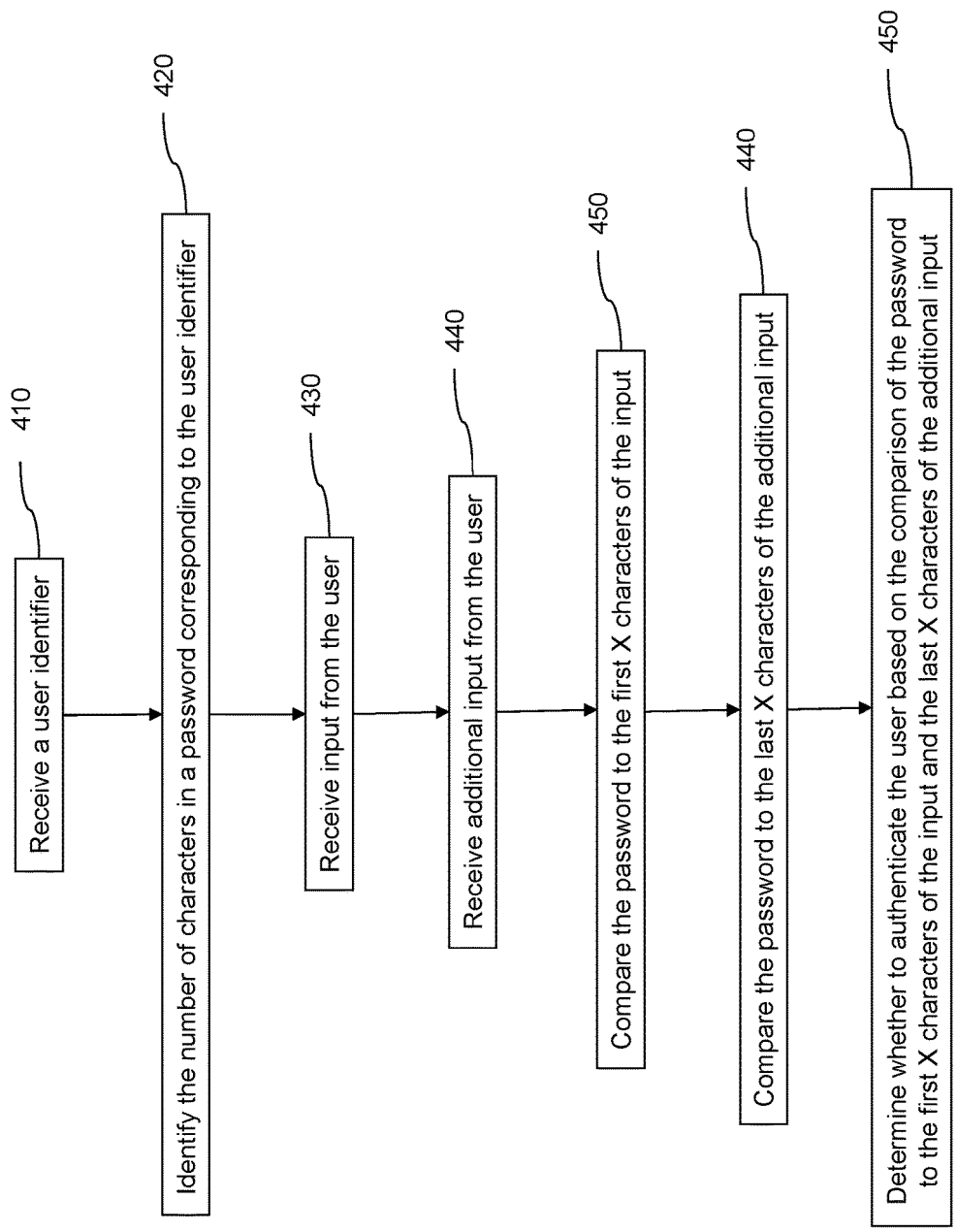
FIG. 4 is a flow diagram illustrating a method for determining whether to authenticate a user according to an embodiment of the invention.

FIG. 3 is a diagram illustrating a system 300 for determining whether to authenticate a user according to an embodiment of the invention. FIG. 4 is a flow diagram illustrating a method for determining whether to authenticate a user according to an embodiment of the invention (e.g., using the system 300). A user identifier (e.g., first and last name, user name, email address, employee number, etc.) can be received by an interface 310 (410). As used herein, the term "interface" includes a computer hardware device, such as, for example, a keyboard, a touchscreen, a mouse, a microphone, a touchpad, a joystick, a controller, a camera, a disk drive, an input port, etc.

A processor 320 connected to the interface 310 can identify the number of characters in a password corresponding to the user identifier (420). For example, a memory device (also referred to herein as the "authentication store") connected to the processor 320 stores the user identifier and the password associated with the user identifier, and the number of characters in the password is retrieved from the memory device. As used herein, the term "connected" includes operationally connected, logically connected, in communication with, physically or wirelessly connected, engaged, coupled, contacts, linked, affixed, and attached.

Input from the user can be received by the interface 310, such that the number of characters in the input is greater than the number of characters in the password (430). Additional input can be received from the user by the interface 310, such that the number of characters in the additional input is greater than the number of characters in the password (440). The number of characters in the additional input can be equal to, lesser than, or greater than the number of characters in the input.

For example, a user has the user identifier "jdoe123" and password "corvette2012". The user enters the input "corvette2012asdf37" (the last characters entered by the user are dummy characters) and the additional input "658ylm-corvette2012" (the first characters entered by the user are dummy characters). The user can enter input via a physical keyboard or one or more virtual keyboards on a screen. A virtual keyboard can include all letters, all numbers, all symbols, and/or a combination of letters, numbers, and symbols. The user can switch between different keyboards and different keyboard layouts.

The processor 320 can compare the password to the first X characters of the input, where X equals the number of characters in the password (450). Moreover, the processor 320 can compare the password to the last X characters of the additional input (460). In another embodiment, the processor 320 compares the password to the last X characters of the input (the first characters entered by the user are dummy characters), and compares the password to the first X characters of the additional input (the last characters entered by the user are dummy characters). In yet another embodiment, the processor 320 compares the password to the first X characters of the input and the first X characters of the additional input. In still another embodiment, the processor 320 compares the password to the last X characters of the input and the last X characters of the additional input.

The processor 320 can determine whether to authenticate the user based on the comparison of the password to the first X characters of the input and the last X characters of the additional input (470). The user can be authenticated when the first X characters of the input and the last X characters of the additional input match the password. The user can be rejected when the first X characters of the input or the last X characters of the additional input do not match the password. In another embodiment, the processor 320 determines whether to authenticate the user based on a comparison of the password to the first X characters of the input, the last X characters of the input, the first X characters of the additional input, and/or the last X characters of the additional input.

The X keypresses from the input may be ambiguous because there can be more than one character displayed on each key. The same is true for the additional input. However, by knowing the length of the password, combined with the input and the additional input, the processor 320 can determine the password that was entered because of the keyboard layout. The reconstructed password entry can then be hashed and compared against the stored password hash.

In at least one embodiment, the processor 320 generates a first keyboard and a second keyboard having a layout different than the first keyboard, where the input is received through the first keyboard and the additional input is received through the second keyboard. The processor 320 can calculate the optimal number of characters shown on each key. The processor 320 can also select two different keyboard layouts so that they are orthogonal. In other words, entering the same password on the two different keyboards can allow a definite password to be reconstructed once the two inputs and the password length are all combined.

At least one embodiment of the invention provides a system for determining whether to authenticate a user based on user input, where the system includes a means for receiving a user identifier, an input from the user, and an additional input from the user (also referred to herein as the "interface"). The means for receiving the user identifier, the input from the user, and the additional input from the user can include a physical keyboard and/or one or more virtual keyboards. The number of characters in the additional input can be different from the number of characters in the input.

The system can include a means for generating a first virtual keyboard and a means for generating a second virtual keyboard having a layout different from a layout of the first virtual keyboard. The input can be received in the first virtual keyboard; and, the additional input can be received in the second virtual keyboard. The number of characters in the input is greater than the number of characters in the password corresponding to the user identifier; and, the number of characters in the additional input is greater than the number of characters in the password.

In at least one embodiment, the means for generating the first virtual keyboard includes a processor and computer readable program instructions thereon for causing the processor to carry out this function. The computer readable program instructions can include: establishing a number of keys for the first virtual keyboard, establishing the characters for the first virtual keyboard (e.g., letters, numbers, symbols, and/or a combination of letters, numbers and/or symbols), establishing an arrangement for the first virtual keyboard (e.g., number of keys per row, number of keys per column), matching the characters to the keys to create a layout of the first virtual keyboard, and generating the first virtual keyboard on a display based on the matching. As used herein, the term display includes a computer hardware device, such as a touchscreen or monitor.

In at least one embodiment, the means for generating the second virtual keyboard includes a processor and computer readable program instructions thereon for causing the processor to carry out aspects of the present invention. The computer readable program instructions can include: establishing a number of keys for the second virtual keyboard, establishing the characters for the second virtual keyboard (e.g., letters, numbers, symbols, and/or a combination of letters, numbers and/or symbols), establishing an arrangement for the second virtual keyboard (e.g., number of keys per row, number of keys per column), matching the characters to the keys to create a layout of the second virtual keyboard, and generating the second virtual keyboard on a display based on the matching. In at least one embodiment, the first virtual keyboard generating means and the second virtual keyboard generating means are implemented together.

The system can include a means for identifying the number of characters in the password. In at least one embodiment, the means for identifying the number of characters in the password includes a processor and computer readable program instructions thereon for causing the processor to carry out aspects of the present invention. The computer readable program instructions can include: identifying a memory device having the user identifier, identifying the file in the memory device having the user identifier, identifying a password in the file, and determining the number of characters in the password.

The system can include a means for comparing the password to the first X characters of the input and/or the last X characters of the input, wherein X equals the number of characters in the password. In at least one embodiment, the means for comparing the password to the first X characters of the input and/or the last X characters of the input includes a processor and computer readable program instructions thereon for causing the processor to carry out aspects of the present invention. The computer readable program instructions can include: receiving the password, receiving the input, identifying the first X characters of the input, comparing the password to the first X characters of the input, identifying the last X characters of the input, and comparing the password to the last X characters of the input.

The system can include a means for comparing the password to the first X characters of the additional input and/or the last X characters of the additional input, wherein X equals the number of characters in the password. In at least one embodiment, the means for comparing the password to the first X characters of the additional input and/or the last X characters of the additional input includes a processor and computer readable program instructions thereon for causing the processor to carry out aspects of the present invention. The computer readable program instructions can include: receiving the password, receiving the additional input, identifying the first X characters of the additional input, comparing the password to the first X characters of the additional input, identifying the last X characters of the additional input, and comparing the password to the last X characters of the additional input. The above-discussed means for comparing are examples of comparison means for comparing a subset of characters from the first input and/or additional inputs.

The system can include a means for determining whether to authenticate the user based on the comparison of the password to the first X characters of the input, the last X characters of the input, the first X characters of the additional input, and/or the last X characters of the additional input.

In at least one embodiment, the means for determining whether to authenticate the user includes a processor and computer readable program instructions thereon for causing the processor to carry out aspects of the present invention. The computer readable program instructions can include: determining whether the password matches the first X characters of the input; determining whether the password matches the last X characters of the input; determining whether the password matches the first X characters of the additional input; determining whether the password matches the last X characters of the additional input; authenticating the user when the first X characters of the input match the password and the first X characters of the additional input match the password; authenticating the user when the first X characters of the input match the password and the last X characters of the additional input match the password; authenticating the user when the last X characters of the input match the password and the last X characters of the additional input match the password; authenticating the user when the last X characters of the input match the password and the first X characters of the additional input match the password; rejecting the user when the first X characters of the input does not match the password and the first X characters of the additional input does not match the password; rejecting the user when the first X characters of the input does not match the password and the last X characters of the additional input does not match the password; rejecting the user when the last X characters of the input does not match the password and the last X characters of the additional input does not match the password; and, rejecting the user when the last X characters of the input does not match the password and the first X characters of the additional input does not match the password.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
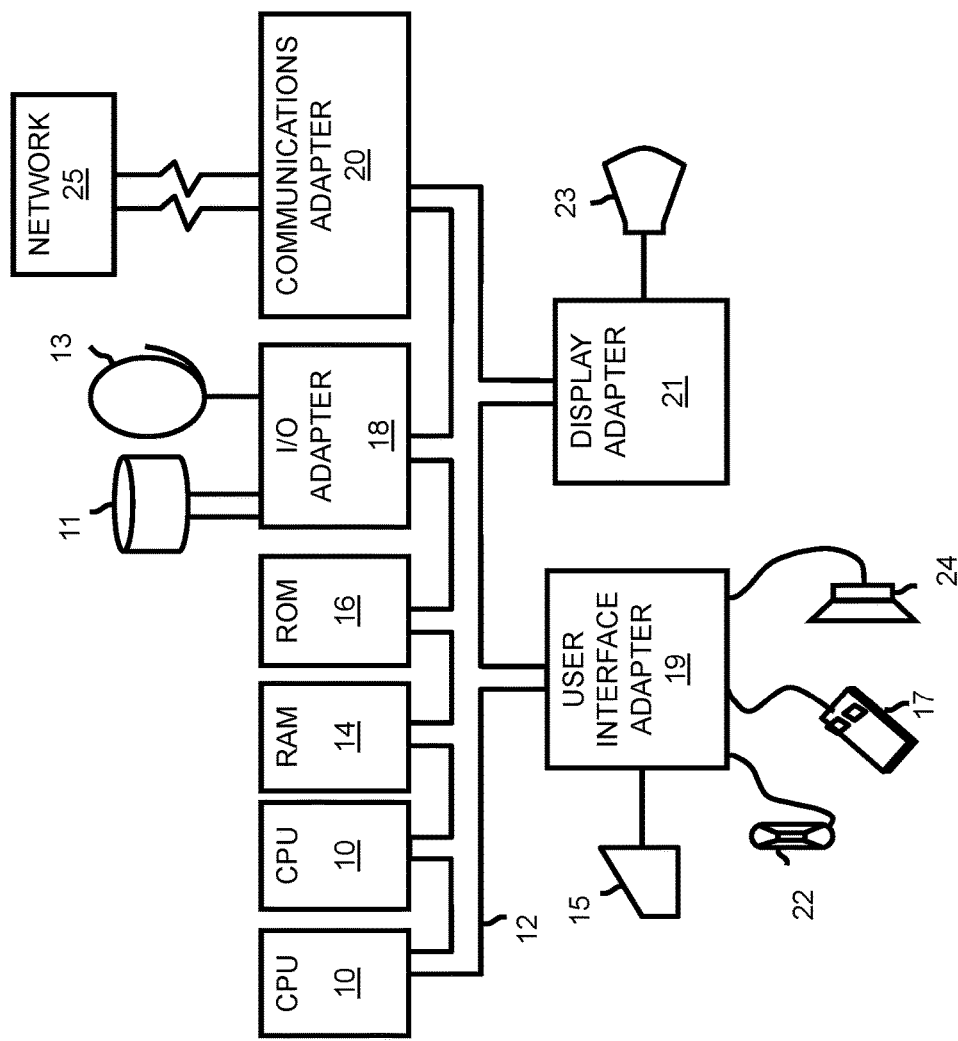
FIG. 5 is a diagram illustrating a computer program product for determining whether to authenticate a user according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining whether to authenticate a user, comprising:
   receiving a user identifier by a first keyboard;
   identifying a stored password corresponding to the user identifier;
   identifying a number of characters in the stored password corresponding to the user identifier;
   receiving a first input from the user through the first keyboard including a password and a first number of random characters;
   receiving a second input from the user through a second keyboard having a different layout from the first keyboard, the second input including the password and a second number of random characters different from the first number of random characters;
   comparing the password to X characters of the first input, wherein X equals the number of characters in the stored password;
   comparing the password to X characters of the second input; and
   determining whether to authenticate the user when:
   a subset of the X characters of the first input match the password, and
   a subset of the X characters of the second input match the password.

2. The method according to claim 1, wherein said determining whether to authenticate the user includes authenticating the user when:
   the first X characters of the first input match the stored password, and
   the last X characters of the second input match the stored password.

3. The method according to claim 1, wherein said determining whether to authenticate the user includes rejecting the user when at least one of:
   the first X characters of the first input does not match the stored password, or
   the last X characters of the second input does not match the stored password.

4. The method according to claim 1, wherein the first keyboard and the second keyboard each comprise a virtual keyboard.

5. The method according to claim 1, comprising:
   comparing the password to the first X characters of the first input, wherein X equals the number of characters in the stored password; and
   comparing the password to the last X characters of the second input.

6. The method according to claim 1, comprising:
   comparing the password to the last X characters of the first input, wherein X equals the number of characters in the stored password;
   and comparing the password to the first X characters the second input.

7. The method according to claim 1, comprising:
   comparing the password to the first X characters of the first input, wherein X equals the number of characters in the stored password; and
   comparing the password to the first X characters of the second input.

8. The method according to claim 1, comprising:
   comparing the password to the last X characters o the first input, wherein X equals the number of characters in the stored password; and
   comparing the password to the last X characters of the second input.

9. The method according to claim 1, wherein each key of the first keyboard and the second keyboard have multiple characters.

10. The method according to claim 1, wherein the first number of random characters has a different length from the second number of random characters.

11. The method of claim 1, wherein the second keyboard layout is generated based on the first keyboard layout.

12. The method of claim 11, wherein the second keyboard layout is orthogonal to the first keyboard layout.

13. The method of claim 1, wherein the first number and second number of random characters are generated by the user.

14. The method of claim 9, wherein the second keyboard layout is generated based on the first keyboard layout.

15. The method of claim 14, wherein the second keyboard layout is orthogonal to the first keyboard layout.

16. A system for determining whether to authenticate a user based on user input, said system comprising:
    a first virtual keyboard for receiving:
    a user identifier, and
    a first input from the user comprising a password and a first number of random characters, and
    a second virtual keyboard having a layout different from a layout of the first virtual keyboard for receiving a second input from the user comprising the password and a second number of random characters different from the first number of random characters:
    processing circuitry configured to identify a stored password corresponding to the user identifier,
    identify the number of characters in the stored password corresponding to the user identifier;
    compare the password to X characters of the first input, wherein X equals the number of characters in the stored password;
    compare the password to X characters of the second input;
    determine whether to authenticate the user when:
    a subset of the X characters of the first input match the password, and
    a subset of the X characters of the second input match the password.

17. A non-transitory computer-readable medium storing thereon computer readable instructions which when executed by a computer cause the computer to perform a method for determining whether to authenticate a user based on user input, said method comprising:
    receiving a user identifier;
    identifying a stored password corresponding to the user identifier;

identifying a number of characters in the stored password corresponding to the user identifier;

providing a first virtual keyboard and a second virtual keyboard having a layout different from a layout of the first virtual keyboard;

receiving a first input from the user through the first virtual keyboard including the password and a first number of random characters;

receiving a second input from the user through the second virtual keyboard, including the password and a second number of random characters different from the first number of random characters;

comparing the password to X characters of the first input, wherein X equals the number of characters in the stored password;

comparing the password to X characters of the second input; and determining whether to authenticate the user when;

a subset of the X characters of the first input match the password, and a subset of the X characters of the second input match the password.

\* \* \* \* \*